3,188,344
PROCESS FOR THE PREPARATION OF
β-CHLOROPROPIONIC ACID

Henry E. Bromer, Jr., and Arthur L. Kranzfelder, Indianapolis, Ind., assignors to Eli Lilly and Company, Indianapolis, Ind., a corporation of Indiana
No Drawing. Filed July 2, 1962, Ser. No. 207,047
3 Claims. (Cl. 260—539)

This invention relates to an improved process for the preparation of β-chloropropionic acid. More particularly, this invention is concerned with a simple one-step process for producing β-chloropropionic acid in high yield and purity.

β-Chloropropionic acid is a highly useful bifunctional chemical intermediate which combines in one molecule a readily replaceable chloro group and a carboxylic acid group. This bifunctional intermediate is highly useful in the preparation of a wide range of organic chemicals. For example, tricyclamol, a parasympatholytic agent particularly useful in the treatment of gastrointestinal spasm and Parkinsonism, is produced by a process which utilizes β-chloropropionic acid in the synthesis of one of the intermediates therein, β-chloropropiophenone (see U.S. Patent 2,826,590).

At present, in order to obtain β-chloropropionic acid in the degree of purity necessary for utilization as a pharmaceutical intermediate, highly expensive, multistep purification procedures are necessary. Furthermore, the maximum yield without regard to purity which can be obtained by these known processes is severely limited.

It is therefore an object of this invention to provide an improved process for the preparation of β-chloropropionic acid which, in its preferred form, is a one-step process and which renders the desired product in high yield and extremely high purity. It is a further object of this invention to provide a process employing cheap raw materials and simple reaction equipment. These and other objects of this invention will appear more fully hereinafter.

According to this invention, β-chloropropionic acid is produced in heretofore unobtainable yields and purities by a process which comprises reacting approximately one mole of acrylonitrile, 2 to 3 moles of sodium chloride, and 2 to 2.5 moles of 60 to 80 percent by weight aqueous sulfuric acid. In general it is preferred to add the sulfuric acid in its concentrated form (about 18 molar) to a reaction mixture containing acrylonitrile, sodium chloride, and sufficient water to result in a 60 to 80 percent by weight aqueous concentration of the sulfuric acid. This latter embodiment comprises a one-step process wherein the β-chlorophopionic acid is obtained from the reaction mixture in extremely high purities by a simple extraction with an organic solvent, such as benzene.

The following example is further representative of the process of this invention.

EXAMPLE I

A reaction vessel, provided with means for heating, stirring, refluxing, and addition of reactants, was charged with about one mole of acrylonitrile, 2.5 moles of sodium chloride, and sufficient water to result in a selected percent by weight aqueous concentration of sulfuric acid, upon the addition to the reaction mixture of between about 2 and 2.5 moles of 18 molar sulfuric acid. Stirring was initiated and the prescribed amount of sulfuric acid was slowly added to the reaction mixture. Upon completion of the addition, the mixture was stirred and refluxed for about two hours. Sufficient benzene (about a onefold amount of benzene) was then added to extract the organic portion of the mixture and the aqueous portion thereof was discarded. The benzene was then removed from the organic portion by distillation and β-chloropropionic acid was obtained in excellent yields and purities as summarized in the following table.

Table I

| | 1 | 2 | 3 | 4 | 5 |
|---|---|---|---|---|---|
| NaCl (moles) | 2.5 | 2.5 | 2.5 | 2.5 | 2.5 |
| $CH_2=CHCN$ (moles) | 1.0 | 1.0 | 1.0 | 1.0 | 1.0 |
| $H_2SO_4$ (moles) | 2.07 | 2.07 | 2.07 | 2.07 | 2.07 |
| $H_2SO_4$ (aq. conc.) percent | 70.8 | 75.3 | 67.2 | 63.6 | 78.0 |
| Yield do | 94.3 | 91.9 | 92.1 | 88.9 | 85.7 |
| Purity by aq. tit.[1] do | 99.2 | 87.2 | 96.3 | 93.8 | 93.5 |
| Purity by Cl analysis [2] do | 95.6 | 90.3 | 96.7 | 92.5 | 93.0 |

[1] Aqueous titration with sodium hydroxide using bromthymol blue as indicator for the end point.
[2] Macro chlorine determination consisting of a saponification followed by a Volhard determination.

From the foregoing it can be seen that β-chloropropionic acid is produced by the process of this invention in extremely high yield and purity. Furthermore, these excellent results are obtained by an extremely simple and economical, one-step process employing cheap sodium chloride and sulfuric acid. Moreover, high product purities are obtained even though only a very simple benzene extraction is employed.

When the above process was repeated with identical molar proportions of sodium chloride, acrylonitrile, and sulfuric acid, but with the exception that aqueous concentrations of sulfuric acid falling outside the range of 60 to 80 percent were utilized, the desired β-chloropropionic acid was obtained in significantly lower yields and purities. For example, an 83.3 percent aqueous concentration of 2.07 moles of sulfuric acid resulted in a yield of only 62.1 percent and a product purity of only 86.4 percent, as determined by aqueous titration, and only 81.1 percent, as determined by chlorine analysis. When an aqueous concentration of sulfuric acid of 57.7 percent was employed, a similar decrease in yield and product purity was obtained. It therefore appears that the range of 60 to 80 percent aqueous sulfuric acid is a true critical range.

Thus, in general, the process of this invention must be carried out utilizing from about 60 to about 80 percent aqueous sulfuric acid. Excellent results are obtained employing a preferred range of about 63 to 78 percent aqueous sulfuric acid (see Table I), with maximum yields being obtained in the range of 67 to 75 percent. In order to obtain combined maximum yields of β-chloropropionic acid with maximum purity thereof it is particularly preferred to utilize aqueous sulfuric acid in a 70 to 71 percent concentrations. (All of the foregoing percentages are based upon weight of sulfuric acid in water.)

Reaction temperatures can range from those sufficient to initiate the reaction up to the decomposition temperature of the lower decomposing reactant or product. In general, the reaction is carried out at a temperature ranging from about 70° C. up to about 150° C., reflux temperatures being preferred. In the usual case, atmospheric pressure is preferred, although in some closed reaction systems the resulting autogenous pressure may be employed.

The molar proportions of acrylonitrile, sodium chloride, and sulfuric acid utilized in this invention are in the molar ratio of about 1:2 to 3:2 to 2.5, respectively. Excellent results are obtained when about one mole of acrylonitrile, 2.5 moles of sodium chloride, and about 2 moles of sulfuric acid are utilized.

Two hours are usually sufficient to complete the reaction; however, longer reaction times can be employed. For example, reaction times up to about six hours have produced β-chloropropionic acid in excellent yields and purities. It, of course, is preferred to employ as short a reaction time as is consistent with high yields of a quality product. Therefore, reaction times preferably range from about two hours to about four hours.

It is preferred to add the concentrated sulfuric acid to the other reactants (i.e., acrylonitrile, sodium chloride, and water), since a large volume of liquid is thereby available for dissipating the heat released upon the addition of sulfuric acid to water. Thus the temperature of the reaction mixture can be controlled by the rate at which the sulfuric acid is added.

We claim:
1. A process for the preparation of β-chloropropionic acid which comprises reacting at a temperature of about 70–150° C. a mixture of about 1 mole of acrylonitrile, between about 2 and 3 moles of sodium chloride, and between about 2 and about 2.5 moles of 60 to 80 percent aqueous sulfuric acid.
2. A process for the preparation of β-chloropropionic acid which comprises reacting a reflux temperature a mixture of about 1 mole of acrylonitrile, about 2.5 moles of sodium chloride, and about 2 moles of 67 to 75 percent aqueous sulfuric acid.
3. A process for the preparation of β-chloropropionic acid, which comprises commingling acrylonitrile, sodium chloride, and water, the molar proportion of acrylonitrile to sodium chloride being about 1:2.5, adding thereto approximately 18 molar sulfuric acid in a molar ratio to said acrylonitrile of about 2:1, the proportion of water originally present in the mixture being sufficient to dilute the sulfuric acid to approximately 70 percent concentration, and heating the resulting mixture at around reflux temperature for a sufficient time to effect reaction thereof.

References Cited by the Examiner
UNITED STATES PATENTS

| 1,235,283 | 7/17 | Brooks | 260—659 |
| 2,698,347 | 12/54 | Giraitis | 260—659 |
| 2,698,348 | 12/54 | Giraitis | 260—659 |
| 2,820,068 | 1/58 | Cunningham | 260—659 |

OTHER REFERENCES

Fieser: Organic Chemistry, 2nd ed., pages 167, 168 (1950).

References Cited by the Applicant

Nazarov et al.: Zhur. Obschei Khim. 27, 101–110 (1957) (Chem. Abs. 51, I2903 [1] (1957)).

LORRAINE A. WEINBERGER, *Acting Primary Examiner*.

LEON ZITVER, *Examiner*.